C. E. SINGLETON.
TIRE FLUID CONTAINER.
APPLICATION FILED NOV. 15, 1907.

929,255.

Patented July 27, 1909.

Witnesses:
Edward C. Rowland
William H. Mohr

Inventor
Clifton E. Singleton.
By his Attorney
Andrew Wilson.

UNITED STATES PATENT OFFICE.

CLIFTON E. SINGLETON, OF BROOKLYN, NEW YORK.

TIRE-FLUID CONTAINER.

No. 929,255.   Specification of Letters Patent.   Patented July 27, 1909.

Application filed November 15, 1907. Serial No. 402,269.

*To all whom it may concern:*

Be it known that I, CLIFTON E. SINGLETON, a citizen of the United States, residing in Brooklyn, Kings county, New York, have invented certain new and useful Improvements in Tire-Fluid Containers, of which the following is a specification.

My invention relates to a container or closed package for holding tire fluid and for similar purposes, and consists in the particulars hereinafter set forth.

Figure 1:
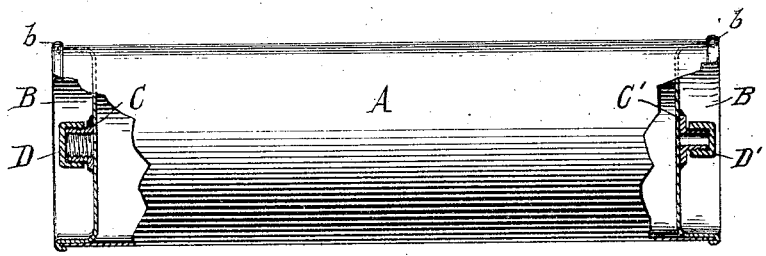
Figure 2:
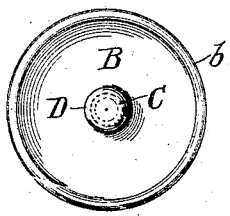

In the drawings, Figure 1, is a side view of one of my improved containers, the ends being partially shown in section to better illustrate the construction; and Fig. 2 is an end view.

The same parts are referred to by similar reference letters in both figures.

The body A, of the container is formed by a stiff sheet metal casing preferably made of tinned plate. The ends of the body are provided with suitable closures B B, having edge flanges $b$, $b$, and being centrally depressed. These closures B B tightly close the ends of the body A. Centrally of the closures I place threaded nipples C C' which are respectively adapted to engage the hose connection of an air pump and the valve of a pneumatic tire. The closures B B are preferably made imperforate, and the nipples C C' are soldered or otherwise fastened thereupon.

In use, the closure is inserted in one end of the container which is then filled with the tire-fluid, and the other closure is inserted and properly secured in place. When it is desired to use the fluid, the closures are perforated behind the nipples by forcing a sharp instrument through the nipples. The container is then connected at one end with the hose coupling of a pneumatic pump and at the other end with the tire valve and the fluid is driven out of the container into the tire by pumping air into the container. If desired, caps may be placed upon the nipples to protect the thread from injury and to serve to close the nipples when openings have been made through the closures B B, if that is desired.

The depressions in the end closures B B permit the nipples C C' to sit back within the ends of the body A so that they are protected from accidental injury, and so as to form a compact and convenient form of container for packing or shipping. The rigid form of the container permits it to be handled, packed and stored without danger of its being punctured or of its bursting when exposed to the heat of the sun or other similar warmth. And the method of emptying the container by use of compressed air makes it practicable to discharge its contents in a clean, efficient and expeditious manner.

Having thus described my invention, what I claim and desire to secure by Letters Patent of the United States is:—

1. In a tire fluid container, the combination of a stiff body casing provided with imperforate end closures having nipples thereupon adapted respectively to engage with an air pump coupling and with the valve of a pneumatic tire.

2. In a tire fluid container, the combination of a stiff body casing provided with imperforate centrally depressed end closures having nipples thereupon adapted respectively to engage with an air pump coupling and with the valve of a pneumatic tire.

CLIFTON E. SINGLETON.

Witnesses:
WM. D. NEILLEY,
WILLIAM H. MOHR.